United States Patent
Hsieh et al.

[11] Patent Number: 5,838,565
[45] Date of Patent: Nov. 17, 1998

[54] MANUFACTURING CONTROL METHOD FOR IC PLANT BATCH SEQUENTIAL MACHINE

[75] Inventors: Hung-Ming Hsieh; Yirn-Sheng Pan; Horng-Huei Tseng, all of Hsinchu, Taiwan

[73] Assignee: Vanguard International Semiconductor Corporation, Hsin-Chu, Taiwan

[21] Appl. No.: 857,165

[22] Filed: May 15, 1997

[51] Int. Cl.⁶ .................................................... G06F 19/00
[52] U.S. Cl. ................................. 364/468.06; 364/468.28
[58] Field of Search ..................... 364/468.01, 468.02, 364/468.03, 468.05–468.09, 468.13, 468.15, 468.18, 468.23, 468.28; 705/7–9

[56] References Cited

U.S. PATENT DOCUMENTS

| | | |
|---|---|---|
| 4,852,001 | 7/1989 | Tsushima et al. ...................... 364/401 |
| 5,155,679 | 10/1992 | Jain et al. ........................... 364/468.13 |
| 5,291,394 | 3/1994 | Chapman ................................ 364/401 |
| 5,291,397 | 3/1994 | Powell ................................... 364/402 |
| 5,351,195 | 9/1994 | Sherman ................................ 364/468 |
| 5,446,671 | 8/1995 | Weaver et al. .......................... 364/468 |

*Primary Examiner*—Reba I. Elmore
*Assistant Examiner*—Steven R. Garland
*Attorney, Agent, or Firm*—George O. Saile; Stephen B. Ackerman; Graham S. Jones, II

[57] ABSTRACT

A method of operating a batch sequential machine in a manufacturing plant to optimize processing of lots of work through a plurality of series of processing stations which perform various functions comprising the following steps. Collect interval-times ($I_{i,j}$) for processing of lots through individual processing stations. Form a matrix of reduced times for processing lots through the processing stations. Determine permutations of the reduced times for a series of combinations of the processing stations for performing required processing tasks. Select the combination of interval-times providing the maximum reduction of total processing time.

31 Claims, 4 Drawing Sheets

MANUFACTURING CONTROL METHOD FOR IC PLANT BATCH SEQUENTIAL MACHINE

BACKGROUND OF THE INVENTION

1. Field of the Invention

This invention relates to manufacturing systems for Integrated Circuit (IC) fabrication and more particularly to control systems for scheduling work at a batch processing work station.

2. Description of Related Art

U.S. Pat. No. 5,446,671 of Weaver et al., "Look-Ahead Method for Maintaining Optimum Queued Quantities of In-Process Parts at a Manufacturing Bottleneck" monitors potential manufacturing bottlenecks and prioritizes lots of work. A priority search value is assigned to prioritize work. Maximum and minimum queue quantity values are provided for each product for which there is a throughput bottleneck in determining the priority of lots to be processed. The processing schedule of a particular lot which is ready to proceed to a bottleneck step is determined based upon an analysis as to whether its maximum and minimum queue quantity values comply with certain criteria. If not, then the lot has a set flag status associated therewith to delay processing until after all other lots which have a clear flag status have been processed. The look-ahead method is initiated when a lot approaches a bottleneck.

U.S. Pat. No. 5,291,397 of Powell et al. for "Method for Resource Allocation and Project Control for the Production of a Product" describes use of slack variables to predict actual final completion date based using parallel processing. The slack variables are also used to allocate resources for production. Critical data is made available to the operator.

U.S. Pat. No. 5,351,195 of Sherman et al. for "Method for Improving Manufacturing Process" describes a method of improving workstation performance by optimal scheduling of jobs. Data is generated as to batch size of materials required for each process within a workstation based upon a given shipping schedule. Data as to workstation variables measuring workstation and factory performance is also generated. The user of the system uses this data to adjust workstations to improve production.

U.S. Pat. No. 5,291,394 of Chapman for "Manufacturing Control and Capacity Planning System" uses an expert system.

U.S. Pat. No. 4,852,001 of Tsushima et al. for "Job Scheduling Method and System" employs workload balancing.

SUMMARY OF THE INVENTION

The conventional way of running chemical stations in an IC plant without any scheduling control causes significant losses in machine productivity.

An object of this invention is to address the problem of determining the optimum combination of job/batch sequences to total minimized cycle time, with particular reference to a chemical processing tools.

Another object of this invention is to provide optimization of sequencing of lots of work through a batch sequential processing machine which serves as a chemical clean station for cleaning (rinsing), photoresist removal, oxide etching, etc.

An objective of the method of this invention is to provide a maximum reduction of total chemical station processing time while considering the recipe route and the individual chemical bank processing time, where each chemical station includes several chemical banks.

In accordance with this invention, a method of operating a batch sequential machine in a manufacturing plant after preventative maintenance steps to optimize processing of lots of work through a plurality of series of processing stations which perform various processing functions includes the steps which follow. Provide a batch sequential machine in a manufacturing plant. Provide a data processing system having memory means for data storage. Provide central processing means for a) accessing data from the memory means; b) receiving data from data input means and c) supplying data to the memory means. Collect interval-times ($I_{i,j}$) for processing of lots through individual processing stations. Form a matrix of reduced times for processing lots through the processing stations. Determine permutations of the reduced times for a series of combinations of the processing stations for performing required processing tasks. Finally, select the combination of interval-times; and provide the maximum reduction of total processing time.

Preferably, form a matrix of reduced times for processing lots through the processing stations is performed in accordance with the equation:

$$C_i C_j = R_{ij} = (I_{ij,1} - I_{i,1}) + (I_{ij,2} - I_{i,2}) + \ldots + (I_{ij,M} - I_{iM}).$$

Preferably, N is the number of recipe routes in a plant. $F_s$ is the Furnace run size. $C_s$ is the Chemical station run size, and the number M of cluster recipes is calculated according to the equation: $M = F_s + C_s$.

Preferably, following forming of the matrix of reduced times the combinations are expanded to N! and data on the expanded combinations is processed.

Preferably, individual reduced total time is calculated in accordance with the equation:

$$T_i = R_{i,1} + R_{i,2} + \ldots + R_{i,N}, \ i = 1 \text{ to } N!$$

Preferably, the combination of maximum reduction of time is calculated in accordance with the equation:

$$\text{Optimum Combination} = \text{Max } (T_i, i = 1 \text{ to } N!)$$

In accordance with another aspect of this invention, production scheduling apparatus operates a manufacturing plant subsequent to preventative maintenance steps. The apparatus includes the following elements. A data processing system has memory means for data storage. Central processing means provides the functions as follows: a) access data from the memory means; b) receive data from data input means and c) supply data to the memory means. There is mean for collecting interval-times ($I_{i,j}$) for processing of lots through individual processing stations; means for forming a matrix of reduced times for processing lots through the processing stations; means for determining permutations of the reduced times for a series of combinations of the processing stations for performing required processing tasks; and means for selecting the combination of interval-times for maximum reduction of total processing time.

Preferably, there are means for forming a matrix of reduced times for processing lots through the processing stations is performed in accordance with the equation:

$$C_i C_j = R_{ij} = (I_{ij,1} - I_{i,1}) + (I_{ij,2} - I_{i,2}) + \ldots + (I^{ij,M} - I_{iM}).$$

Preferably, N is the number of recipe routes in a plant. $F_s$ is Furnace run size. $C_s$ is Chemical station run size. There is means for calculating the number M of cluster recipes according to the equation: $M=F_s \div C_s$.

Preferably, means is provided for expanding the combinations of the matrix of reduced times to N! and means for processing data on the expanded combinations.

Preferably, means is provided for calculating the combination of individual reduced total time in accordance with the equation:

$$T_i = R_{i,1} + R_{i,2} + \ldots + R_{i,N}, \; i=1 \text{ to } N!$$

Preferably, means is provided for calculating the combination of maximum reduction of time in accordance with the equation: Optimum Combination=Max $(T_i, i=1 \text{ to } N!)$.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Scheduling in an IC Fab (Fabrication Plant) is a complex problem because of reentrant product flows, diverse types of equipment, product mix, complex production processes, unpredictable yield and equipment downtime. Wafer processing is done layer by layer. Almost every layer requires a chemical station to perform processing steps, such as initial cleaning, photoresist removal, oxide etching etc.

While IC Fab plants employ four types of equipment including batch, batch sequential, serial, and part sequential machines, the chemical stations used with this invention employ batch sequential processing machines.

The manufacturing scheduling method of this invention provides a method and means for resolving scheduling problems for a batch sequential machine for an IC Fab chemical station. A mathematical formula is employed for scheduling of the machine.

I. Definitions

N: Number of recipe routes
$F_s$: Furnace run size
$C_s$: Chemical station run size
M: Number of recipes in every cluster, see Eq. 1 below
$C_N$: Nth cluster
$I_M$: Interval time of the Mth recipe
$I_{N,M}$: Mth recipe interval-time of the Nth cluster
$C_N C_{N-1}$: Interval time between Nth and (N-1)th cluster
$R_{ij}$: Reduced interval-time between ith and jth cluster.
$T_i$: Total reduced time of the ith combination
QDR: Quick Dump Rinse
SPM: Sulfuric acid ($H_2SO_4$) Peroxide ($H_2O_2$) Mix
APM: Ammonia ($NH_4OH$) Peroxide ($H_2O_2$) Mix
DHF: Dilute HydroFluoric Acid
HPM: Hydrochloric acid (HCl) Peroxide ($H_2O_2$) Mix
Batch sequential machine:

A batch sequential processing machine, is one in which a number of jobs are processed together as a batch. Such a batch sequential processing machine completes processing of a first batch after a specified initial time delay and thereafter completes other batches at specified intervals after the initial time delay.

Recipe route:

A recipe route is a route through which wafers pass within a chemical bank according to a product process under the constraint of the design (construction) of the different function chemical stations.

Chemical bank processing time:

Each chemical station includes several chemical banks. The wafer processing time in a given chemical bank such as initial cleaning, photoresist removal, oxide etching, etc. depends upon the process engineering setup.

II. Assumptions

1. The recipe cluster number is selected according to the furnace and chemical station run sizes.
2. All recipe run numbers are equal.
3. All chemical bank acid change times are equal.

III. Method Description

Figure 1A:
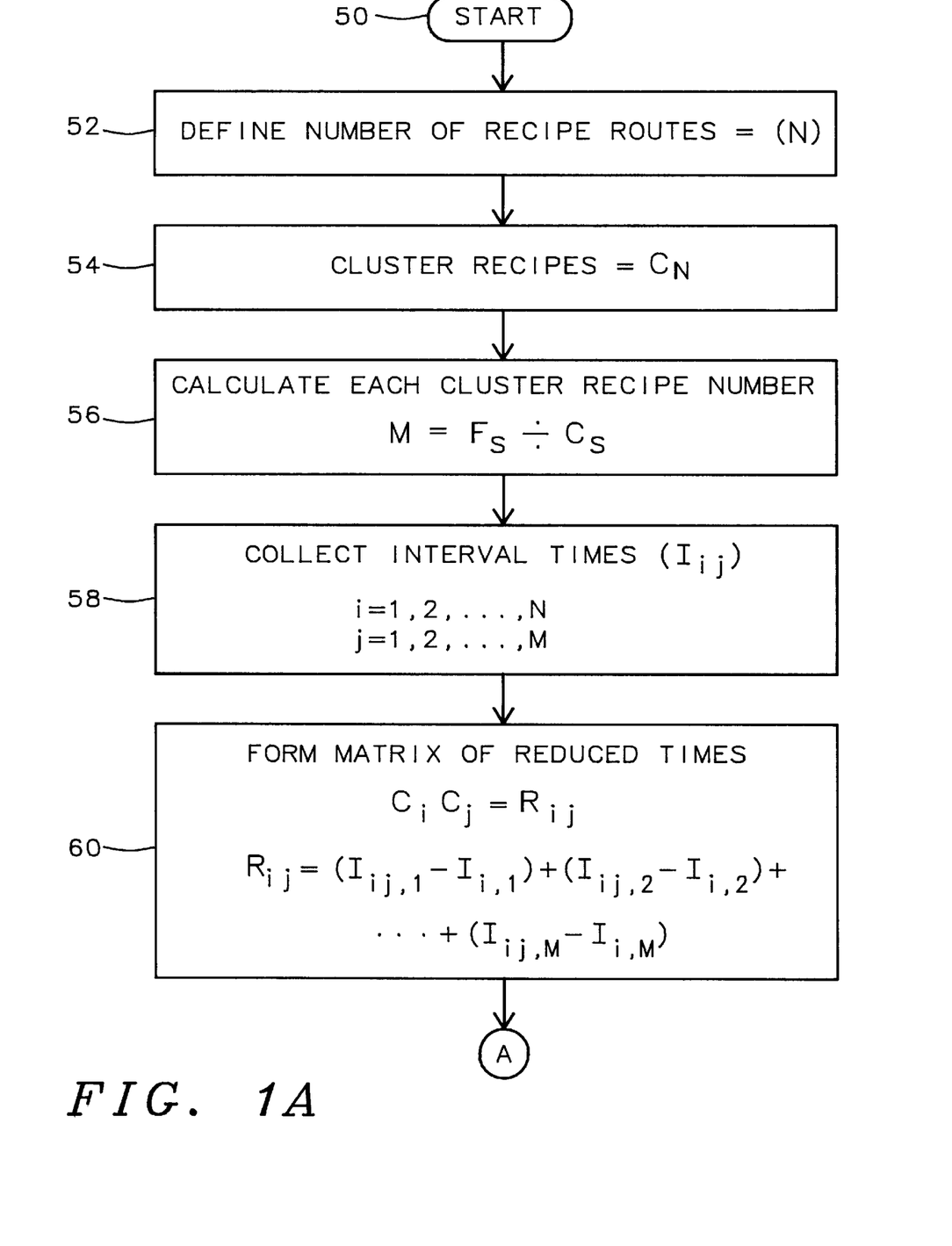
FIGS. 1A and 1B, when combined, show a flow chart of a method of controlling operation of a chemical station in a fabrication plant in accordance with this invention.
Figure 1B:
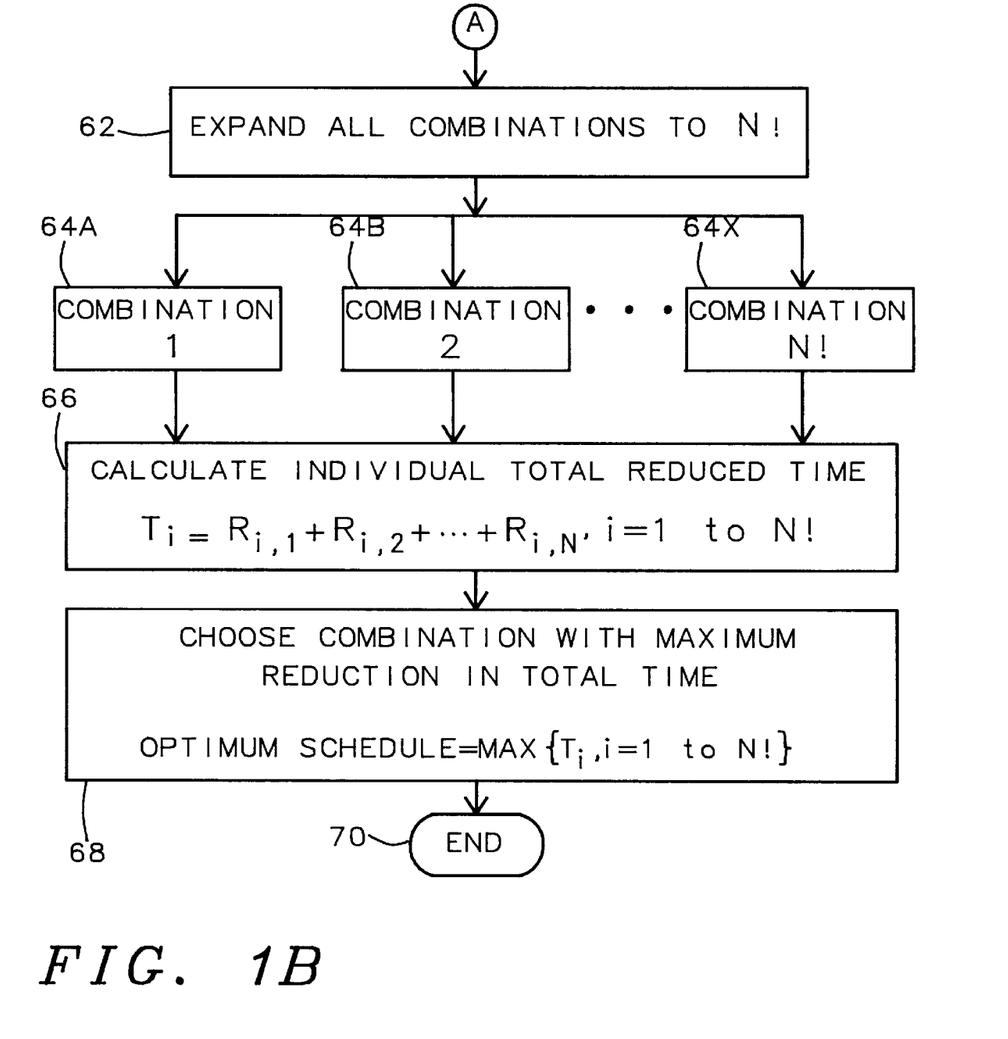

FIGS. 1A and 1B, when combined, show a flow chart of a method for controlling operation of a chemical station in a fabrication plant in accordance with this invention. The two parts of the flow chart are connected by connector A from block 60 in FIG. 1A to block 62 in FIG. 1B.

Block 50 is the START of the method of this invention which leads to block 52.

In block 52, the system must determine the number of permutations of routes (through banks) to which the recipes are allocated for performance of chemical treatments. The system takes lots of Work In Process (WIP) through the various locations at which a function such as SPM, APM, DHF, and HPM are performed. In short the step of block 52 defines the number "N" of recipe routes through which lots being processed will pass as different functions are performed in the chemical processing equipment.

In block 54, which follows the step in block 52, the system determines the cluster recipe route number $C_N = N$.

In block 56, which follows the step in block 54, the system determines the recipe number M of each cluster $$M = F_s \div C_s \quad \text{(Eq. 1)}$$

In block 58, which follows the step in block 56, the system collects base and mix model interval-times (the detail content is shown in the Base Model and the Mix Model Tables I and II below.

TABLE I

| | Base Model (No recipe mix interval-time) | | | |
|---|---|---|---|---|
| | $I_1$ | $I_2$ | ... | $I_M$ |
| $C_1$ | $I_{1,1}$ | $I_{1,2}$ | ... | $I_{1,M}$ |
| $C_2$ | $I_{2,1}$ | $I_{2,2}$ | ... | $I_{2,M}$ |
| ... | ... | ... | ... | ... |
| $C_N$ | $I_{N,1}$ | $I_{N,2}$ | ... | $I_{N,M}$ |

TABLE II

| | Mix Model: (Include recipe mix interval-time) | | | |
|---|---|---|---|---|
| | $I_1$ | $I_2$ | ... | $I_M$ |
| $C_1C_2$ | $I_{12,1}$ | $I_{12,2}$ | ... | $I_{12,M}$ |
| $C_1C_3$ | $I_{13,1}$ | $I_{13,2}$ | ... | $I_{13,M}$ |
| ... | ... | ... | ... | ... |
| $C_1C_N$ | $I_{1N,1}$ | $I_{1N,2}$ | ... | $I_{1N,M}$ |
| $C_2C_1$ | $I_{21,1}$ | $I_{21,2}$ | ... | $I_{21,M}$ |
| $C_2C_3$ | $I_{23,1}$ | $I_{23,2}$ | ... | $I_{23,M}$ |
| ... | | | | |
| $C_2C_N$ | $I_{2N,1}$ | $I_{2N,2}$ | ... | $I_{2N,M}$ |
| $C_{N-1}C_N$ | $I_{(N-1)N,1}$ | $I_{(N-1)N,2}$ | ... | $I_{(N-1)N,M}$ |
| $C_NC_1$ | $I_{N1,1}$ | $I_{N1,2}$ | ... | $I_{N1,M}$ |
| $C_NC_2$ | $I_{N2,1}$ | $I_{N2,2}$ | ... | $I_{N2,M}$ |
| ... | ... | ... | ... | ... |
| $C_NC_{N-1}$ | $I_{N(N-1),1}$ | $I_{N(N-1),2}$ | ... | $I_{N(N-1),M}$ |

In block 60, which follows the step in block 58, the system forms a reduced time matrix $[C_i, C_j]$

TABLE III

| | $C_1$ | $C_2$ | | $C_N$ |
|---|---|---|---|---|
| $C_1$ | $R_{1,1}$ | $R_{1,2}$ | ... | $R_{1,N}$ |
| $C_2$ | $R_{2,1}$ | $R_{2,2}$ | ... | $R_{2,N}$ |
| ... | ... | ... | $R_{ij}$ | ... |
| $C_N$ | $R_{N,1}$ | $R_{N,2}$ | ... | $R_{N,N}$ |

$$[C_i, C_j] = R_{ij} \quad \text{(Eq. 2)}$$
$$[C_i, C_j] = (I_{ij,1} - I_{i,1}) + (I_{ij,2} - I_{i,2}) + \ldots + (I_{ij,M} - I_{iM}) \quad \text{(Eq. 3)}$$

In block 62, which follows the step in block 60, the system expands all recipe cluster combinations to a number of permutations of N combinations of the clusters, which is preferably the number N factorial. That is to say, all combinations of the N clusters or N! combinations are determined in the expansion step.

A set of N blocks 64A, 64B, ... 64X illustrates that the system expands all recipe cluster combinations from 1, 2, ..., N! or N factorial after the step of block 62.

In block 66, which follows the step in blocks 64A–64X, the system calculates individual combinations of total reduced time in accordance with equation 4, as follows:

$$T_i = R_{i,1} + R_{i,2} + \ldots + R_{i,N}, \quad i=1 \text{ to } N! \quad \text{(Eq. 4)}$$

In block 68, the Optimum Combination (Optimum Schedule Combination) is determined. The system chooses the combinations with the maximum total reduced time in accordance with equation 5, as follows:

$$\text{Optimum Combination} = \text{Max}(T_i, i=1 \text{ to } N!) \quad \text{(Eq. 5)}$$

EXAMPLE

I. Background

EQID: 1-UTC1 Function: Ultra Clean Chemical Station
EQID=Equipment Identification and the 1-UTC1 is a type of equipment used in a shop flow control system.

II. Application of Method

1. Define recipe route number N=4.

| No | Recipe | Route |
|---|---|---|
| 1 | 111 | SPM->APM->DHF->HPM |
| 2 | 141 | SPM->APM |
| 3 | 171 | SPM |
| 4 | 181 | SPM     ->DHF |

2. Cluster recipe route number=$C_N$

For example, with a furnace run size ($F_s$=6 lots) and chemical station run size ($C_s$=2 lots), one can cluster recipe route to $C_N$ types ($C_1$, $C_2$, $C_3$, $C_4$).

The number of recipes "M" in each cluster is three which is calculated, using Eq. 1 above, as follows:

$M = F_s/C_s = 6/2 = 3$ $C_1$: 111→111→111
$C_2$: 141→141→141
$C_3$: 171→171→171
$C_4$: 181→181→181

3. Collect cluster interval-time each other and form reduced time matrix (unit minutes).

3–1. Collect cluster interval-times as shown in Tables IV and V.

TABLE IV

| | | Base Model (No recipe mix interval-time) | | |
|---|---|---|---|---|
| No | Cluster | $I_1$ min. | $I_2$ min. | $I_3$ min. |
| 1 | $C_1$ | 12.5 | 12.5 | 12.5 |
| 2 | $C_2$ | 12.5 | 12.5 | 12.5 |
| 3 | $C_3$ | 12.5 | 12.5 | 12.5 |
| 4 | $C_4$ | 12.5 | 12.5 | 12.5 |

TABLE V

| | | Mix Model (Include recipe mix interval-time) | | |
|---|---|---|---|---|
| No | Cluster | I1 min. | I2 min. | I3 min. |
| 1 | $C_1C_2$ | 8.0 | 8.0 | 12.5 |
| 2 | $C_1C_3$ | 8.0 | 12.5 | 12.5 |
| 3 | $C_1C_4$ | 8.0 | 12.5 | 12.5 |
| 4 | $C_2C_1$ | 12.5 | 12.5 | 12.5 |
| 5 | $C_2C_3$ | 8.0 | 12.5 | 12.5 |
| 6 | $C_2C_4$ | 8.0 | 12.5 | 12.5 |
| 7 | $C_3C_1$ | 42.0 | 12.5 | 12.5 |
| 8 | $C_3C_2$ | 24.0 | 12.5 | 12.5 |
| 9 | $C_3C_4$ | 20.0 | 12.5 | 12.5 |
| 10 | $C_4C_1$ | 30.0 | 12.5 | 12.5 |
| 11 | $C_4C_2$ | 12.5 | 12.5 | 12.5 |
| 12 | $C_4C_3$ | 8.0 | 12.5 | 12.5 |

TABLE VI

| | $C_1$ min. | $C_2$ min. | $C_3$ min. | $C_4$ min. |
|---|---|---|---|---|
| $C_1$ | — | 9.0 | 4.5 | 4.5 |
| $C_2$ | 0 | — | 4.5 | 4.5 |
| $C_3$ | -30 | -12.0 | — | 8.5 |
| $C_4$ | -18 | 0.0 | -4.5 | — |

4. Expand all recipe cluster combinations and calculate the resultant total time reduction.

4-1. Expand all combinations of N! as follows:

$$N!=4!=4\times3\times2\times1=24.$$

The details of the combinations are listed in the N! Combination in Table VII below:

TABLE VII

| Combination N! = 4 | Cluster 1 | Cluster 2 | Cluster 3 | Cluster 4 | Total Time $T_i$ Reduced (minutes) |
|---|---|---|---|---|---|
| 1 | $C_1$ | $C_2$ | $C_3$ | $C_4$ | 5.0 |
| 2 | $C_1$ | $C_2$ | $C_4$ | $C_3$ | 9.0 |
| 3 | $C_1$ | $C_3$ | $C_2$ | $C_4$ | -3.0 |
| 4 | $C_1$ | $C_3$ | $C_4$ | $C_2$ | -4.0 |
| 5 | $C_1$ | $C_4$ | $C_2$ | $C_3$ | 9.0 |
| 6 | $C_1$ | $C_4$ | $C_3$ | $C_2$ | -12.0 |
| 7 | $C_2$ | $C_1$ | $C_3$ | $C_4$ | -4.0 |
| 8 | $C_2$ | $C_1$ | $C_4$ | $C_3$ | 0.0 |

TABLE VIII

| UTC1 | Robot | Robot IA | | | | | Robot IB | | | | | | | Robot II | | | |
|---|---|---|---|---|---|---|---|---|---|---|---|---|---|---|---|---|---|
| | | 1 Loader 2 LOTS 3 ROWS | 2 Chuck Clean DRY (B) | 3 SPM (A) 5:1 | 4 QDR (B) | 5 ISO Bath | 6 ISO Bath | 7 APM 1:4:20 | 8 DHF (B) 100:1 | 9 QDR (A) | 10 QDR (C) | 11 HPM 1:1:5 | | 12 QDR (A) | 13 POOL | Un- load- er | Process Time minutes |
| PROG. # | CS111 | | 300 | 300 | 60 | | 300 | 300 | 60 | 300 | 300 | 300 | | 300 | 420 | 10 | 54.8 |
| | CD141 | | 300 | 300 | 60 | | 300 | 300 | | | | | | 300 | 420 | 10 | 36.8 |
| | CS171 | | 300 | 300 | 60 | | | | | | | | | 300 | 420 | 10 | 26.3 |
| | CS181 | | 300 | 300 | 60 | | | | 75 | 300 | | | | 300 | 420 | 10 | 33.1 |

QDR: Qhick Dump Rinse
APM: Ammonia Peroxide Mix
HPM: Hydrochloric acid Peroside Mix
QDR, SPM, DHF (B) recycled; (A) not recycled; (C) not recycled
SPM: Sulfuric Acid Peroxide Mix
DHF: Dilute HF TABLE VII-continued

| Combination N! = 4 | Cluster 1 | Cluster 2 | Cluster 3 | Cluster 4 | Total Time $T_i$ Reduced (minutes) |
|---|---|---|---|---|---|
| 9 | $C_2$ | $C_3$ | $C_1$ | $C_4$ | -21.0 |
| 10 | $C_2$ | $C_3$ | $C_4$ | $C_1$ | -22.0 |
| 11 | $C_2$ | $C_4$ | $C_1$ | $C_3$ | -9.0 |
| 12 | $C_2$ | $C_4$ | $C_3$ | $C_1$ | -30.0 |
| 13 | $C_3$ | $C_1$ | $C_2$ | $C_4$ | -16.5 |
| 14 | $C_3$ | $C_1$ | $C_4$ | $C_2$ | -25.5 |
| 15 | $C_3$ | $C_2$ | $C_1$ | $C_4$ | -7.5 |
| 16 | $C_3$ | $C_2$ | $C_4$ | $C_1$ | -25.5 |
| 17 | $C_3$ | $C_4$ | $C_1$ | $C_2$ | 17.5 |
| 18 | $C_3$ | $C_4$ | $C_2$ | $C_1$ | -8.5 |
| 19 | $C_4$ | $C_1$ | $C_2$ | $C_3$ | -4.5 |
| 20 | $C_4$ | $C_1$ | $C_3$ | $C_2$ | 25.5 |
| 21 | $C_4$ | $C_2$ | $C_1$ | $C_3$ | 4.5 |
| 22 | $C_4$ | $C_2$ | $C_3$ | $C_1$ | -25.5 |
| 23 | $C_4$ | $C_3$ | $C_1$ | $C_2$ | -25.5 |
| 24 | $C_4$ | $C_3$ | $C_2$ | $C_1$ | -16.5 |

5. Choose the combination with the maximum total time reduction. Referring to equation 5 above and TABLE VII above, the time is calculated in Equations 5a and 5b below, as follows:

$$\text{Optimum Combination} = \text{Max}\{T_i, i = 1 \text{ to } 4!\} \quad \text{(Eq. 5a)}$$
$$= \{T_2, T_5\} = 9 \text{ minutes} \quad \text{(Eq. 5b)}$$

The values "T2 and T5" are derived from TABLE VII which is the N! combination table to find the maximum reduction in time after searching TABLE VII. In the above equation, the value "9 minutes" is derived from the fact that the maximum value of the Total Time Ti Reduced in the last column of TABLE VII for T2 and T5 is 9 minutes, since that is the value of time reduced for both of those times. Chemical Station 1-UTC1 recipe schedule A. Cluster route: $C_1C_2$ $C_4$ $C_3$ Recipe route:

111--111---111--141--141--141--181--181--181--171--171--171

B. Cluster route: $C_sC_4$ $C_2$ $C_3$

Recipe route

111--111--111--181--181--181--141--141--141--171--171--171

TABLE VIII below is provided to facilitate understanding the physical structure of the chemical station 1-UTC1.

Figure 2:
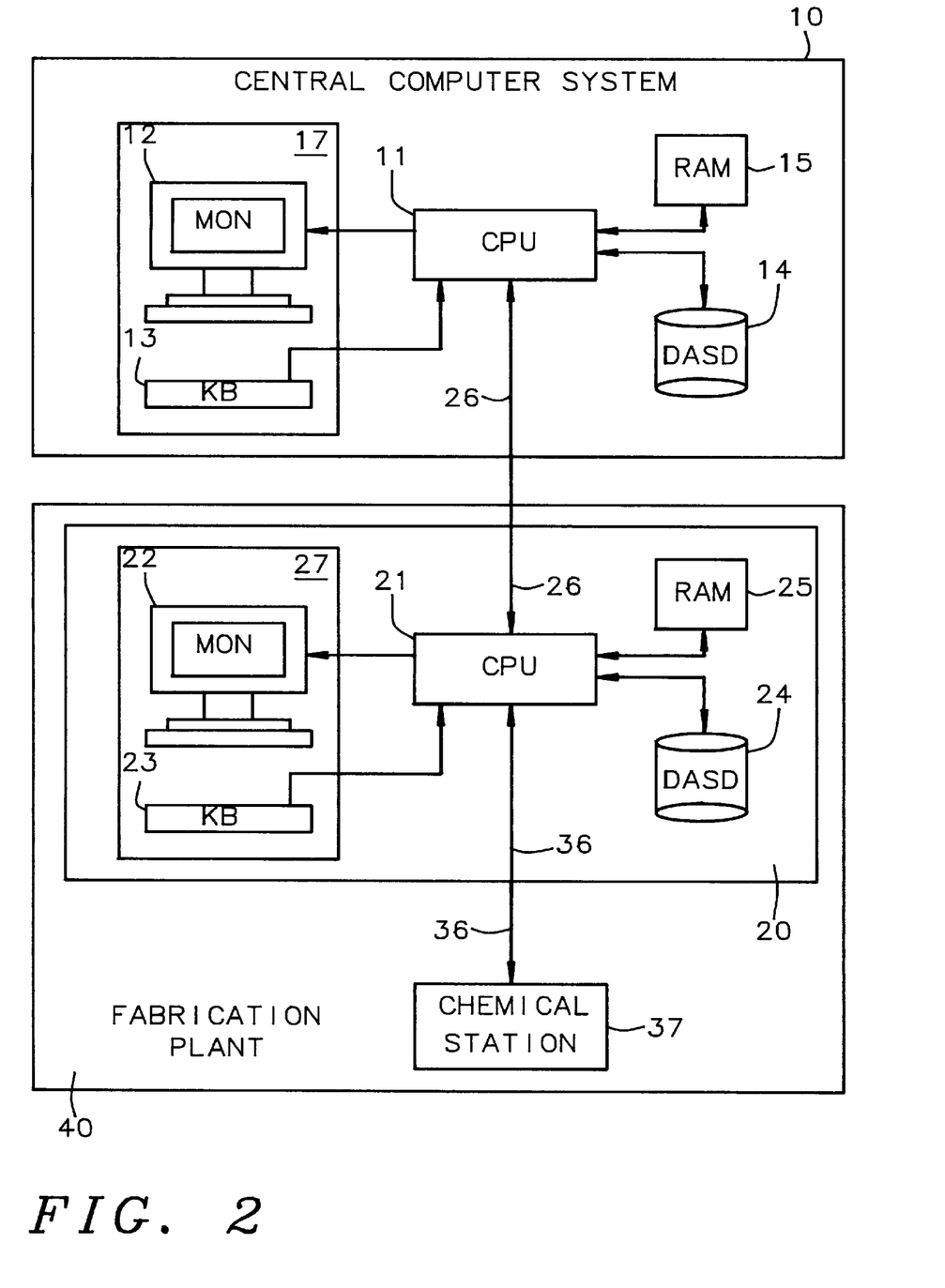
FIG. 2 shows a manufacturing facility incorporating a central computer system connected to control a chemical station operation in a plant in accordance with the method of this invention.

FIG. 2 shows a manufacturing facility incorporating a central computer system 10 connected to control operation of a batch sequential machine in a fabrication plant 40 in accordance with the method of this invention.

The central computer system 10 includes a (Central Processing Unit) central CPU 11 connected to DASD (Direct Access Storage Device) 14 (e.g. a disk drive) and to Random Access Memory (RAM) 15. In addition, the central CPU 11 is connected to monitor (MON) 12 and to a keyboard (KB) 13, which monitor 12 and keyboard 13 serve as a terminal 17 by the CPU operator to enter data on the keyboard and to provide other conventional interactive functions. The monitor 12 includes a display screen for display of data from the central CPU 11 to the operator for use in making selections of alternative features during operation of the system of FIG. 2.

The central CPU 11 is connected by line 26 to a plant CPU 21 in the fabrication plant 40. Plant 40 includes a chemical station computer control system 20 and a chemical station 37 composed of manufacturing tools which perform many manufacturing steps in a process under the control of the chemical station computer control system 20.

In turn, the plant CPU 21 is connected to DASD (Direct Access Storage Device) 24 (e.g. a disk drive) and to Random Access Memory (RAM) 25. In addition, the plant CPU 21 is connected to monitor (MON) 22 and to a keyboard (KB) 23 which serve as a terminal 27 used by the operator to enter data on the keyboard and to provide other conventional interactive functions. The monitor MON includes a display screen for display of data from the CPU 21 to the plant operator for use in making selections of alternative features during operation of the system of FIG. 2.

The CPU 21 is connected by line 36 to chemical station 37 for collection of data from the chemical station 37 and for sending instructions to the chemical station 37.

In the DASD 14 are stored the programs which perform the method of manufacturing control of a chemical station in the plant 40 which are accessed during the planning cycle for performing chemical processing during the operation of the plant 40. The CPU 21 collects data from the chemical station which is used to determine the operating conditions of the apparatus such as a furnace and a chemical station on the chemical station and to provide the parameters as to operation of the chemical station for use by the CPU 11 during performance of the program.

Figure 3:
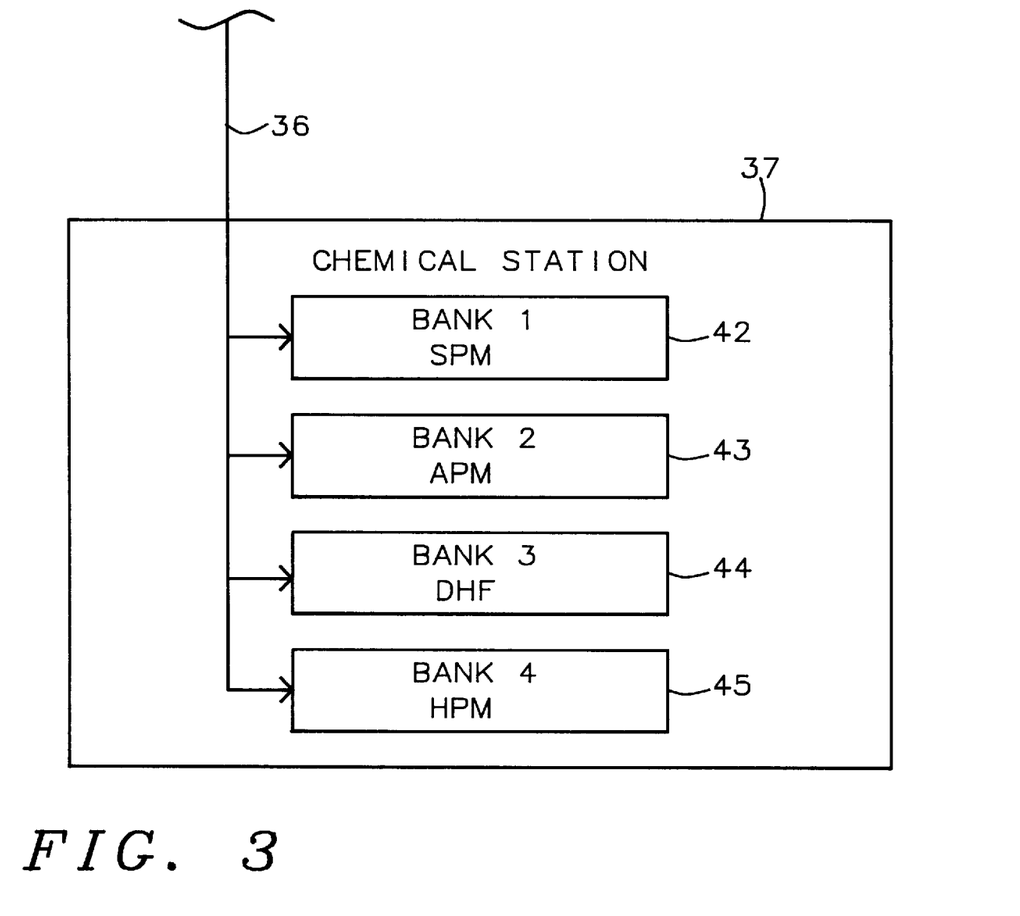
FIG. 3 shows components of the chemical station of FIG. 2.

FIG. 3 shows the chemical station 37 of FIG. 2 with several banks 42–45 for operation in accordance with this invention. The station includes SPM (Sulfuric acid and Peroxide Mix) in bank 42, APM (Ammonium Peroxide Mix) in bank 43, DHF (Dilute Hydrogen Fluoride) in bank 44, and HPM (Hydrochloric acid and Peroxide Mix) in bank 45. The banks 42–45 are connected to the fabrication plant CPU 21 by line 36. The station in FIG. 3 is an Ultra Clean Chemical Station.

While this invention has been described in terms of the recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by letters patent is as follows:

1. A method of operating a batch sequential machine in a manufacturing plant subsequent to preventative maintenance steps to optimize processing of lots of work through a plurality of series of processing stations which perform various processing functions, comprising the following steps:

providing a batch sequential machine in a manufacturing plant, providing a data processing system having memory means for data storage, providing central processing means for
  a) accessing data from said memory means,
  b) receiving data from data input means and
  c) supplying data to said memory means, collecting interval-times ($I_{i,j}$) for processing of lots through individual processing stations, forming a matrix of reduced times for processing lots through said processing stations, determining permutations of said reduced times for a series of combinations of said processing stations for performing required processing tasks, and selecting the combination of interval-times providing the maximum reduction of total processing time.

2. A method in accordance with claim 1 wherein forming a matrix of reduced times for processing lots through said processing stations is performed in accordance with the equation:

$$C_i C_j = R_{ij} = (I_{ij,1} - I_{i,1}) + (I_{ij,2} - I_{i,2}) + \ldots + (I_{ij,M} - I_{iM}).$$

3. A method in accordance with claim 2 wherein, individual reduced total time is calculated in accordance with the equation:

$$T_i = R_{i,1} + R_{i,2} + \ldots + R_{i,N}, i=1 \text{ to } N!.$$

4. A method in accordance with claim 3 wherein the combination of maximum reduction of time is calculated in accordance with the equation:

$$\text{Optimum Combination} = \text{Max} (T_i, i=1 \text{ to } N!).$$

5. A method in accordance with claim 2 wherein the combination of maximum reduction of time is calculated in accordance with the equation:

$$\text{Optimum Combination} = \text{Max} (T_i, i=1 \text{ to } N!).$$

6. A method in accordance with claim 1 wherein

N is the number of recipe routes in a plant, $F_s$ is Furnace run size, $C_s$ is Chemical station run size, and the number M of cluster recipes is calculated according to the equation:

$$M = F_s/C_s = 6/2 = 3.$$

7. A method in accordance with claim 6 wherein forming matrix of reduced times for processing lots through said processing stations is performed in accordance with the equation:

$$C_i C_j = R_{ij} = (I_{ij,1} - I_{i,1}) + (I_{ij,2} - I_{i,2}) + \ldots + (I_{ij,M} - I_{iM}).$$

8. A method in accordance with claim 7 wherein, following forming of said matrix of reduced times the combinations are expanded to N! and data on the expanded combinations is processed.

9. A method in accordance with claim 8 wherein, individual reduced total time is calculated in accordance with the equation:

$$T_i = R_{i,1} + R_{i,2} + \ldots + R_{i,N}, i=1 \text{ to } N!.$$

10. A method in accordance with claim 9 wherein the combination of maximum reduction of time is calculated in accordance with the equation:

$$\text{Optimum Combination} = \text{Max} (T_i, i=1 \text{ to } N!).$$

11. A method in accordance with claim 8 wherein the combination of maximum reduction of time is calculated in accordance with the equation:

$$\text{Optimum Combination} = \text{Max} (T_i, i=1 \text{ to } N!).$$

12. A method in accordance with claim 7 wherein, individual reduced total time is calculated in accordance with the equation:

$$T_i = R_{i,1} + R_{i,2} + \ldots + R_{i,N}, i=1 \text{ to } N!.$$

13. A method in accordance with claim 12 wherein the combination of maximum reduction of time is calculated in accordance with the equation:

$$\text{Optimum Combination} = \text{Max} (T_i, i=1 \text{ to } N!).$$

14. A method in accordance with claim 7 wherein the combination of maximum reduction of time is calculated in accordance with the equation:

$$\text{Optimum Combination} = \text{Max} (T_i, i=1 \text{ to } N!).$$

15. A method in accordance with claim 6 wherein, following forming of said matrix of reduced times the combi- 16. A method in accordance with claim 15 wherein, individual reduced total time is calculated in accordance with the equation:

$$T_i = R_{i,1} + R_{i,2} + \ldots + R_{i,N}, \ i=1 \text{ to } N!.$$

17. A method in accordance with claim 16 wherein the combination of maximum reduction of time is calculated in accordance with the equation:

$$\text{Optimum Combination} = \text{Max}(T_i, i=1 \text{ to } N!).$$

18. A method in accordance with claim 15 wherein the combination of maximum reduction of time is calculated in accordance with the equation:

$$\text{Optimum Combination} = \text{Max}(T_i, i=1 \text{ to } N!).$$

19. A method in accordance with claim 6 wherein, individual reduced total time is calculated in accordance with the equation:

$$T_i = R_{i,1} + R_{i,2} + \ldots + R_{i,N}, \ i=1 \text{ to } N!.$$

20. A method in accordance with claim 19 wherein the combination of maximum reduction of time is calculated in accordance with the equation:

$$\text{Optimum Combination} = \text{Max}(T_i, i=1 \text{ to } N!).$$

21. A method in accordance with claim 6 wherein the combination of maximum reduction of time is calculated in accordance with the equation:

$$\text{Optimum Combination} = \text{Max}(T_i, i=1 \text{ to } N!).$$

22. A method in accordance with claim 1 wherein, individual reduced total time is calculated in accordance with the equation:

$$T_i = R_{i,1} + R_{i,2} + \ldots + R_{i,N}, \ i=1 \text{ to } N!.$$

23. A method in accordance with claim 22 wherein the combination of maximum reduction of time is calculated in accordance with the equation:

$$\text{Optimum Combination} = \text{Max}(T_i, i=1 \text{ to } N!).$$

24. A method in accordance with claim 1 wherein the combination of maximum reduction of time is calculated in accordance with the equation:

$$\text{Optimum Combination} = \text{Max}(T_i, i=1 \text{ to } N!).$$

25. A production scheduling apparatus for operating a manufacturing plant subsequent to preventative maintenance steps, comprising a data processing system having memory means for data storage, central processing means for
 a) accessing data from said memory means,
 b) receiving data from data input means and
 c) supplying data to said memory means, means for collecting interval-times ($I_{i,j}$) for processing of lots through individual processing stations, means for forming a matrix of reduced times for processing lots through said processing stations, means for determining permutations of said reduced times for a series of combinations of said processing stations for performing required processing tasks, and means for selecting the combination of interval-times for maximum reduction of total processing time.

26. Apparatus in accordance with claim 25 wherein forming a matrix of reduced times for processing lots through said processing stations is performed in accordance with the equation:

$$C_i C_j = R_{ij} = (I_{ij,1} - I_{i,1}) + (I_{ij,2} - I_{i,2}) + \ldots + (I_{ij,M} - I_{iM}).$$

27. Apparatus in accordance with claim 26 wherein

N is the number of recipe routes in a plant, $F_s$ is Furnace run size, $C_s$ is Chemical station run size, and said apparatus including means for calculating the number M of cluster recipes according to the equation:

$$M = F_s / C_s = 6/2 = 3.$$

28. Apparatus in accordance with claim 27 wherein means is provided for forming a matrix of reduced times for processing lots through said processing stations is performed in accordance with the equation:

$$C_i C_j = R_{ij} = (I_{ij,1} - I_{i,1}) + (I_{ij,2} - I_{i,2}) + \ldots + (I_{ij,M} - I_{iM}).$$

29. Apparatus in accordance with claim 28 wherein, means is provided for expanding the combinations of said matrix of reduced times to N! and means for processing data on the expanded combinations.

30. Apparatus in accordance with claim 29 wherein means is provided for calculating the combination of individual reduced total time in accordance with the equation:

$$Ti = R_{i,1} + R_{i,2} + \ldots + R_{i,N}, \ i=1 \text{ to } N!.$$

31. Apparatus in accordance with claim 30 wherein means is provided for calculating the combination of maximum reduction of time in accordance with the equation:

$$\text{Optimum Combination} = \text{Max}(T_i, i=1 \text{ to } N!).$$

* * * * *